ര്യ
3,071,561
PYRIDINE DERIVATIVES
Ben A. Bluestein, Schenectady, N.Y., assignor to General Electric Company, a corporation of New York
No Drawing. Filed Apr. 30, 1959, Ser. No. 809,920
14 Claims. (Cl. 260—46.5)

This invention relates to difunctional beta-pyridylethyl silanes having the formula

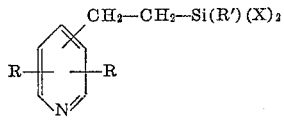

(1)

and to their preparation, where R is a member selected from the class consisting of hydrogen and lower alkyl radicals, e.g., alkyl radicals containing from 1 to 8 carbon atoms, R' is a monovalent hydrocarbon radical free of aliphatic unsaturation, and X is a hydrolyzable radical selected from the class consisting of halogen, e.g., fluorine, chlorine, bromine, and iodine, and lower alkoxy radicals i.e., alkoxy radicals containing from 1 to 8 carbon atoms This invention also relates to polysiloxanes consisting in whole or in part of recurring units having the formula

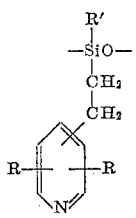

(2)

where R and R' are as previously defined.

A number of hydrolyzable pyridylethyl silanes are known in the art. For example, Cislak Patent 2,854,455 describes beta-pyridyl-4-ethyl trichlorosilane prepared by the addition of 4-vinylpyridine to trichlorosilane. Beta-pyridyl-2-ethyltrichlorosilanes prepared by adding trichlorosilane to 2-vinylpyridine in the presence or absence of a catalyst such as a trialkylamine are described in the copending application of John F. Brown, Serial No. 766,670, filed October 13, 1958, and assigned to the same assignee as the present invention. While these trifunctional pyridylethyl trichlorosilanes are useful in the organosilicon chemistry art, their utility is seriously restricted since their trifunctionality prevents their use as the main component of organosilicon fluids and elastomers, since the main components of the fluids and elastomers of necessity are difunctional materials.

It is believed that the failure of the prior art to disclose difunctional pyridylethyl silanes is because of the fact that the prior art methods of preparing trifunctional pyridylethyl silanes are unsatisfactory for the preparation of difunctional material. For example, when one attempts to add methyldichlorosilane to a vinyl pyridine using heat alone, as shown in the aforementioned Cislak patent, it is found that no addition reaction occurs. Similarly, when one attempts the same reaction in the presence of a trialkylamine such as the tributyl amine disclosed in the aforementioned Brown application, no reaction occurs. Apparently, the presence of the silicon-bonded methyl group and the absence of the third silicon-bonded chlorine atom in methyldichlorosilane renders the methods of the prior art ineffective.

The present invention is based on my discovery that difunctional beta-pyridylethyl silanes can be prepared by effecting reaction between difunctional monohydrocarbon substituted silanes having the formula (3)    $HSi(R')(X)_2$ and vinyl pyridines having the formula

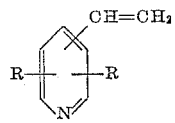

(4)

where R, R' and X are as previously defined, in the presence of a catalyst composition comprising a cuprous compound selected from the class consisting of cuprous halides and cuprous oxide and a diamine having the formula (5)    $(Y)(Y')N(CH_2)_mN(Y')_2$ where $m$ is an integer equal to from 1 to 6, inclusive, Y is a lower alkyl radical and Y' is a member selected from the class consisting of hydrogen, lower alkyl radicals, amino-alkyl radicals, and alkylaminoalkyl radicals, dialkylaminoalkyl radicals and mixtures thereof.

This present invention provides a one-step process for the preparation of difunctional silanes containing both silicon-bonded beta-pyridylethyl radicals and silicon-bonded monovalent hydrocarbon radicals free of aliphatic unsaturation, which are particularly useful in preparation of organosilicon fluids and elastomers having polar properties.

The monohydrocarbon substituted difunctional silanes within the scope of Formula 3 include compounds in which the R' radical is, for example, an alkyl radical, e.g., methyl, ethyl, propyl, butyl, isobutyl, octyl, etc. radicals; and aryl radicals, e.g., phenyl, diphenyl, naphthyl, tolyl, xylyl, etc. radicals; cycloaliphatic radicals, e.g., cycloheptyl, cyclohexyl, etc. radicals; aralkyl radicals, e.g. benzyl, phenylethyl, etc. radicals; halogenated aryl radicals, e.g., chlorophenyl, dibromophenyl chloronaphthyl, etc. radicals.

The class of vinyl pyridines which can be employed in the practice of the present invention is defined by Formula 4 above in which the vinyl group can be attached to any of the various carbon atoms in the pyridine ring and in which the various lower alkyl radicals represented by the letter R may be attached to any of the carbon atoms in the pyridine ring. Illustrative of the vinyl pyridines within the scope of the present invention are, for example, 2-vinyl pyridine, 3-vinyl pyridine, 4-vinyl pyridine, 2-methyl-4-vinyl pyridine, 2,5-dimethyl-4-vinyl pyridine, 3-octyl-5-vinyl pyridine, 2-methyl-5-butyl-4-vinyl pyridine, etc.

Among the various diamines within the scope of Formula 5 which can be employed in the practice of the present invention can be mentioned, for example, the following materials:

N,N,N',N'-tetramethylethylenediamine
N,N,N',N'-tetraethylethylenediamine
N,N,N'-trimethylethylenediamine
N.N-dimethyl-N',N'-diethylethylenediamine
N,N-dimethylethylenediamine
N-methyl-N,N',N'-triethylethylenediamine
N,N,N',N'',N''-pentamethyldiethylenetriamine
N,N,N',N'-tetramethylmethylenediamine
N,N,N'-trimethyl-N'-ethylethylenediamine
N,N,N',N'-tetramethylpropylenediamine
N,N,N'-trimethyl-N'-octylethylenediamine
N,N',N'',N''-tetramethyldiethylenetriamine
N,N,N'-trimethyldiethylenetriamine
N-methylhexamethylenediamine In carrying out the process of the present invention, the hydrocarbon substituted difunctional silane within the scope of Formula 3, the vinyl pyridine within the scope of Formula 4, the diamine within the scope of Formula 5 and the cuprous compound are merely added to a suitable reaction vessel and heated, preferably with agitation, for a time suitable to affect reaction between the difunctional silane and the vinyl pyridine.

The proportions of reactants and the reaction conditions employed in the practice of the present invention may be varied within wide limits. Since, however, the desired reaction product within the scope of Formula 1 is formed from one mole of the difunctional silane within the scope of Formula 3 and one mole of the vinyl pyridine within the scope of Formula 4, in the preferred embodiment of my invention equimolar amounts of the dichlorosilane and the vinyl pyridine are employed. However, excesses of either reactant may be employed without departing from the scope of the present invention. For example, satisfacory results are obtained employing from 0.1 to 10 moles of the difunctional silanes within the scope of Formula 3 per mole of the vinyl pyridine within the scope of Formula 4. The amounts of the various components of the catalyst composition may also be varied within wide limits. On the basis of the total number of moles of the difunctional silane within the scope of Formula 3 and the vinyl pyridine within the scope of Formula 4, I employ from 1 to 25 mole percent and preferably from 1 to 10 mole percent of the diamine within the scope of Formula 5 and from 1 to 20 mole percent and preferably from 1 to 10 mole percent of the cuprous compound selected from the class consisting of cuprous halide and cuprous oxide.

Since the reaction of the present invention is a heterogeneous reaction, it is preferred to conduct the reaction with agitation. One suitable method for conducting reaction is to add the various reactants and the catalyst composition to a reaction vessel and heat the reactants to the reflux temperature of the mixture. Gentle refluxing of the reaction mixture provides sufficient agitation for satisfactory completion of the reaction. It is generally found that the reflux temperature varies from a temperature of about 50° C. at the beginning of the reaction to 100 to 225° C. upon completion of the reaction. When conducting the reaction at atmospheric reflux temperature employing equimolar amounts of methyldichlorosilane and 2-vinyl pyridine with 2 mole percent each of cuprous chloride and N,N,N',N'-tetramethylethylenediamine, it is found that the reaction is complete in about 25 hours, at which time the percent conversion to the deisred beta-pyridyl-2-ethyl methyldichlorosilane is greater than 50%.

Although the preferred method of conducting the reaction is under reflux conditions at atmospheric pressure, it should be understood that the reaction can also be carried out employing reduced pressures as well as pressures above atmospheric. In the case of variation of the pressure it is obvious that the reflux temperature will increase as the pressure increases and decrease as the pressure decreases. It should also be understood that the reaction of the present invention can be carried out without employing reflux conditions, suitable agitation of the reaction can be accomplished by means well known in the art. Even in the absence of agitation, the reaction of the present invention will proceed although the rate of reaction is not as fast as desirable. Temperatures at which the reaction can be effected vary from as low as room temperature, e.g., a temperature of about 20° C., to temperatures of the order of 250° C. when superatmospheric conditions are employed. The time required for effecting reaction of the present invention varies with a number of factors, including the degree of agitation, the temperature of the reaction, the concentration of the various catalyst components and the particular dichlorosilane and vinyl pyridine employed in the reaction. In general, satisfactory reaction is accomplished in times ranging from 15 to 100 or more hours.

While the reaction of the present invention is preferably carried out in the absence of solvents, the use of solvents inert under the reaction conditions is not precluded. For example, the reaction can be carried out in hydrocarbon solvents such as toluene and in such polar aliphatic hydrocarbon solvents as propionitrile and acetonitrile.

After completing the reaction between the vinyl pyridine within the scope of Formula 4 and the silane within the scope of Formula 3, the resulting beta-pyridyl ethyl silane within the scope of Formula 1 is recovered from the reaction mixture by any suitable means. For example, the reaction mixture can be filtered to remove the catalyst and the filtrate can be fractionally distilled to isolate the product. While fractional distillation is a useful method for isolating the desired product, it is sometimes found that complexes which form between the desired product and other components of the reaction mixture prevent satisfactory recovery of the reaction product by distillation. This is particularly true when X of the starting silane of Formula 3 is halogen and the vinyl group of the starting pyridine of Formula 4 is attached to the 4 position. One very successful method of simplifying product recovery in this case is by the substitution of these chlorine atoms with ethoxy radicals. This is accomplished by adding ethylorthoformate to the reaction mixture after reaction has been effected. The ethylorthoformate is employed in the ratio of approximately one mole per mole of silicon-bonded chlorine in the reaction mixture. The ethoxy derivatives are then fractionally distilled since the ethoxy derivatives of the various silanes do not form complexes and have widely different boiling points.

The difunctional pyridyl ethyl silanes within the scope of Formula 1 may be converted by fairly conventional procedures into siloxane homopolymers containing the recurring structural unit of Formula 2 and can also be converted into siloxanes which are copolymers containing the intercondensed unit of Formula 2 as well as one or more siloxane units having the formula (6)          $(R')_3SiO_{1/2}$
(7)          $(R')_2SiO$
(8)          $(R')SiO_{3/2}$ where R' is as previously described. These resulting copolymers contain the siloxane unit within the scope of Formula 2 and have the average formula (9) 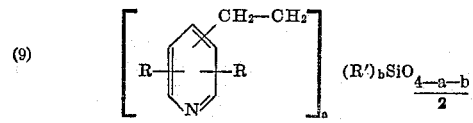

where R and R' are as previously defined, $a$ has a value of from 0.1 to less than 1.0, e.g., from 0.1 to 0.99, and $b$ has a value from 1.0 to 2.3, the sum of a plus $b$ being equal to from 1.1 to 2.5, and preferably from 1.9 to 2.3.

The difunctional silane within the scope of Formula 1 may be converted to an organopolysiloxane homopolymer or copolymer by hydrolyzing and condensing the difunctional pyridyl ethyl silane alone or with one or more other hydrolyzable silane containing from one to three silicon-bonded R' groups. Preferably, the hydrolyzable group of the silane within the scope of Formula 1 is the same as the hydrolyzable group of the other silane with which this first silane is cohydrolyzed. In carrying out the hydrolysis and condensation, the silane within the scope of Formula 1 and any other hydrolyzable silane is added to water to convert the hydrolyzable groups to hydroxy groups and to condense these hydroxy groups to form siloxane linkages. When the silane within the scope of Formula 1 and any other hydrolyzable silanes employed contain a halogen as the hydrolyzable group, the hydrolysis results in a hydrohalic acid which reacts with the pyridine nucleus to form the pyridine hydrohalide during the hydrolysis and condensation. The hydrohalide is converted back to the pyridine derivative by neutralizing the reaction mixture with any suitable neutralizing agent such as sodium hydroxide, potassium hydroxide, sodium carbonate, etc. A sufficient amount of the neutralizing agent is employed to neutralize all of the hydrogen halide generated during the hydrolysis and condensation reaction. Upon neutralization, the condensation product separates from the aqueous hydrolysis medium and is isolated, for example, by decantation.

The particular nature of the condensation product depends on the nature of the silicon-bonded organic groups within the scope of R' and also depends on the ratio of the pyridyl ethyl and R' groups to the silicon atoms. When the sum of $a$ and $b$ in Formula 9 is less than about 1.9, the organosiloxane is resinous in nature. When the sum of $a$ and $b$ is from about 1.98 to 2.01, a high molecular weight fluid approaching the viscosity of a gum is formed. When the sum of $a$ and $b$ is greater than about 2.1, the final product is a triorganosilyl chain-stopped silicone fluid.

The resins, gum-like fluids, and chain-stopped fluids within the scope of Formula 9 have the same utility as corresponding organopolysiloxane materials which are substituted with conventional organo groups rather than containing both the conventional groups and beta-pyridylethyl groups. In addition, these materials are particularly valuable in applications where resistance to non-polar solvents is required. The silicone elastomers and resins exhibit ion exchange properties because of the presence of the silicon-bonded beta-pyridylethyl radicals.

As with conventional organopolysiloxanes, the organopolysiloxane resins within the scope of Formula 9 can be converted to hard infusible resins by the addition of suitable curing agents such as the paint dryer type of catalysts. These resins can be prepared with or without filler incorporated therein. The chain-stopped fluids within the scope of Formula 9 can be used as lubricants with or without the incorporation therein of additional lubricity additives. The high viscosity gummy materials within the scope of Formula 9 can be converted to silicone elastomers by the incorporation therein of suitable fillers and cross-linking agents. The preferred filler for this application is a finely divided silica filler such as a fume silica, a precipitated silica or a silica aerogel. However, other fillers such as finely divided titania, alumina and carbon black can be used as fillers. The preferred class of cross-linking agents is the organoperoxide vulcanizing agents, with benzoyl peroxide and di-alpha-cumyl peroxide being among the preferred organoperoxides.

In order that those skilled in the art may better understand how the present invention may be practiced, the following examples are given by way of illustration and not by way of limitation.

Example 1

A reaction vessel was charged with ingredients in the ratio of 47.5 moles of 2-vinyl pyridine, 52.5 moles of methyldichlorosilane, 1.63 moles of N,N,N',N'-tetramethylethylenediamine, and 4.8 moles of cuprous chloride. This reaction mixture was heated to its reflux temperature of 52° C. and heated at reflux for 22 hours during which time the reflux temperature rose to 142° C. At the end of this time, the reaction mixture was fractionally distilled to yield beta-pyridyl(-2-)ethyl methyldichlorosilane which had a boiling point of 100° C. at 10 mm. The identity of the compound was confirmed by infrared analysis. The material recovered represented a better than 50% conversion based on the limiting reactant 2-vinyl pyridine.

Example 2

When the procedure of Example 1 is repeated with the exception that 2,6-dimethyl-4-vinyl pyridine was used in place of the 2-vinyl pyridine, beta-(2,6-dimethylpyridyl-2)-ethyl methyldichlorosilane is recovered.

Example 3

When the procedure of Example 1 is repeated with the exception that phenyl dichlorosilane is substituted for methyldichlorosilane, beta-pyridyl(-2-)ethyl phenyldichlorosilane is produced.

Example 4

When the procedure of Example 1 is repeated with the exception that cuprous oxide is used in place of cuprous chloride, beta-pyridyl(-2-)ethyl methyldichlorosilane is recovered.

Example 5

Beta-pyridyl(-2-)ethyl methyldichlorosilane is prepared by repeating by the procedure of Example 1 employing 50 moles of 2-vinyl pyridine, 50 moles of methyldichlorosilane, 25 moles of N,N,N',N'',N''-tetramethyldiethylenetriamine, and 20 moles cuprous chloride.

Example 6

Beta-pyridyl(-2-)ethyl-4-chlorophenyldichlorosilane is prepared by the procedure of Example 1 from 40 moles chlorophenyldichlorosilane, 60 moles 2-vinyl pyridine, and 1 mole each of cuprous chloride and N,N,N',N'-tetramethylethylenediamine.

Example 7

The procedure of Example 1 was repeated except that after the reaction mixture had been refluxed for 22 hours, the reaction mixture was cooled and 100 moles of ethylorthoformate were added to replace the silicon-bonded chlorine atoms with silicon-bonded ethoxy radicals. The resulting material was then fractionally distilled to yield beta-pyridyl-2-ethyl methyldiethoxysilane which had a boiling point of about 81 to 115° C. at one millimeter. The identity of the product was confirmed by infrared analysis. The yield was in excess of 60% based on the limiting reactant 2-vinyl pyridine.

Example 8

A reaction vessel was charged with ingredients in the ratio of 47.5 moles of 4-vinyl pyridine, 52.5 moles of methyldichlorosilane, 1.63 moles of N,N,N',N'-tetramethylethylenediamine and 4.8 moles of cuprous chloride. This reaction mixture was heated at its reflux temperature for 16 hours during which time the reflux temperature rose from about 50° C. to about 210° C. The catalyst was filtered from the reaction mixture and ethylorthoformate was added to the reaction mixture in an amount equal to 100 moles to replace the silicon-bonded chlorine atoms with silicon-bonded ethoxy radicals. The resulting material was then fractionally distilled to yield beta-pyridyl-4-ethylmethyl diethoxysilane which boiled at 100 to 125° C. at one millimeter. The identity of this material was confirmed by infrared analysis. The yield of the beta-pyridyl-4-ethylsilane was in excess of 50% based on the starting 4-vinyl pyridine. When the procedure of this example was repeated except that the cuprous chloride was omitted, no reaction took place.

Example 9

A reaction vessel is charged with 47.5 moles of 2-vinyl pyridine, 52.5 moles of methyldimethoxysilane, 1.63 moles of N,N,N',N'-tetramethylethylenediamine and 4.8 moles of cuprous iodide. This reaction mixture is heated at its reflux temperature for 24 hours and fractionally distilled to yield beta-pyridyl-2-ethylmethyldimethoxysilane.

While the foregoing examples have described the process of the present invention in connection with a catalyst system comprising a cuprous compound and a diamine, it is sometimes found advantageous to also include a trialkylamine in the catalyst system so as to increase slightly the yield of desired reaction product. For example, when the procedure of Example 8 is repeated with 4.0 moles of tributylamine added to the reaction mixture, it is found that the yield of product increases from the 50% level of Example 8 to about 56%. The particular trialkylamines which are useful in this respect are those in which the alkyl groups are lower alkyl groups containing from one to eight carbon atoms. When the trialkylamine is employed, it is present in an amount equal to from 1 to 25 mole percent, and preferably from 1 to 10 mole percent, based on the total number of moles of the vinyl pyridine and the silane within the scope of Formula 3.

*Example 10*

An organosilicon fluid useful as a lubricant and heat transfer fluid is prepared by slowly adding a mixture of 10 moles of beta-pyridyl(-2-)ethyl methyldichlorosilane, 10 moles of dimethyldichlorosilane, and 0.1 mole of trimethylchlorosilane to 1 liter of stirred ice water. This hydrolyzate is neutralized with sodium carbonate and the resulting oil layer is separated from the aqueous layer, resulting in a silicone fluid containing beta-pyridyl-2-ethyl methyl siloxane units, dimethyl siloxane units, and trimethyl siloxane units.

*Example 11*

An organo silicon gum is prepared from the compounds of the present invention by adding beta-pyridyl-(-2-)ethyl methyldichlorosilane to a volumetric excess of water and stirring the reaction mixture to hydrolyze the silicon-bonded chlorine atoms and condense the resulting silanol groups. The reaction mixture is then neutralized with sodium carbonate and a high molecular weight fluid consisting of recurring beta-pyridyl-2-ethyl methyl siloxane units is formed. This fluid is then isolated and mixed with 30 parts per million by weight of potassium hydroxide and heated at a temperature of 150° C. for six hours to form a high molecular weight gum consisting essentially of recurring beta-pyridyl-2-ethyl methyl siloxane units. This gum is converted to an organosilicon rubber by milling equal parts by weight of this gum with silica aerogel and 0.03 part by weight, based on the weight of the gum, of benzoyl peroxide. The milled product is press cured at 125° C. for 15 minutes and cured in an oven at 200° C. for 24 hours to produce a silicone rubber which is particularly useful in gasket applications where oil resistance is required.

What I claim as new and desire to secure by Letters Patent of the United States is:

1. Beta-pyridylethylsilanes having the formula

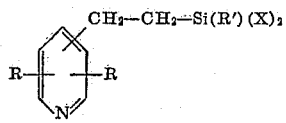

where X is a member selected from the class consisting of halogen and lower alkoxy radicals, R is a member selected from the class consisting of hydrogen and lower alkyl radicals and R' is a monovalent hydrocarbon radical free of aliphatic unsaturation.

2. The beta-pyridylethyl silanes of claim 1 in which X is halogen.
3. The beta-pyridylethyl silanes of claim 1 in which X is a lower alkoxy radical.
4. Beta-pyridyl-4-ethylmethyldiethoxysilane.
5. Beta-pyridyl-4-ethylmethyldichlorosilane.
6. Beta-pyridyl(-2-)ethyl methyldichlorosilane.
7. Beta-pyridyl-2-ethyl methyldiethoxysilane.
8. The method of preparing a beta-pyridylethyl silane having the formula

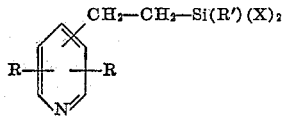

which comprises contacting a silane having the formula

with a vinyl pyridine having the formula

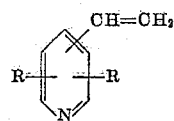

in the presence of a catalyst composition comprising a cuprous compound selected from the class consisting of cuprous halides and cuprous oxide and a diamine having the formula

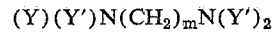

where X is a member selected from the class consisting of halogen and lower alkoxy radicals, R is a member selected from the class consisting of hydrogen and lower alkyl radicals, R' is a monovalent hydrocarbon radical free of aliphatic unsaturation, m is an integer from 1 to 6, inclusive, Y is a lower alkyl radical, and Y' is a member selected from the class consisting of hydrogen, lower alkyl radicals, aminoalkyl radicals, alkylaminoalkyl radicals dialkylaminoalkyl radicals and mixtures thereof.

9. The method of claim 8 in which X is halogen.
10. The method of claim 8 in which X is a lower alkoxy radical.
11. The method of forming beta-pyridyl(-2-)ethyl methyldichlorosilane which comprises contacting methyldichlorosilane with 2-vinyl pyridine in the presence of a catalyst composition comprising a cuprous compound selected from the class consisting of cuprous halides and cuprous oxide and a diamine having the formula

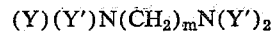

where m is an integer equal to from 1 to 6, inclusive, Y is a lower alkyl radical, and Y' is a member selected from the class consisting of hydrogen, lower alkyl radicals, aminoalkyl radicals, alkylaminoalkyl radicals, dialkylaminoalkyl radicals, and mixtures thereof.

12. The method of making beta-pyridyl(-2-)ethyl methyldichlorosilane which comprises contacting methyldichlorosilane with 2-vinyl pyridine in the presence of cuprous chloride and N,N,N',N'-tetramethylethylenediamine.

13. An organopolysiloxane consisting essentially of recurring

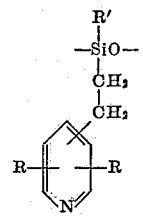

units, where R is a number selected from the class consisting of hydrogen and lower alkyl radicals and R' is a monovalent hydrocarbon radical free of aliphatic unsaturation.

14. An organopolysiloxane composition consisting essentially of

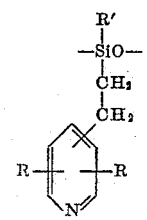

units and at least one siloxane unit having a formula selected from the class consisting of $(R')_3SiO_{1/2}$, $(R')_2SiO$, and $(R')SiO_{3/2}$, said composition having the average formula

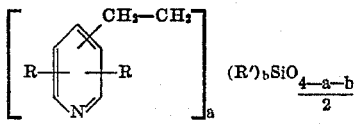

where R is a member selected from the class consisting of hydrogen and lower alkyl radicals, R' is a monovalent hydrocarbon radical free of aliphatic unsaturation, $a$ has a value of from 0.1 to less than 1.0, $b$ has a value of from 1.0 to 2.3 and the sum of $a$ plus $b$ is from 1.1 to 2.5.

References Cited in the file of this patent

UNITED STATES PATENTS

| | | |
|---|---|---|
| 2,500,110 | Allen et al. | Mar. 7, 1950 |
| 2,584,665 | Bluestein | Feb. 5, 1952 |
| 2,838,515 | Sommer | June 10, 1958 |
| 2,854,455 | Cislak | Sept. 30, 1958 |

OTHER REFERENCES

Nozakura: Chem. Abstracts, vol. 51, col. 8086 (1957).